United States Patent [19]

Juffinger

[11] Patent Number: 5,696,751
[45] Date of Patent: Dec. 9, 1997

[54] OPTICAL READING HEAD HAVING A DISPLACEABLE LIGHT SOURCE FOR SCANNING A TARGET HAVING SURFACE STRUCTURE

[75] Inventor: Josef Juffinger, Thiersee, Austria

[73] Assignee: Schablonentechnik Kufstein Aktiengesellschaft, Schaftenau Kufstein

[21] Appl. No.: 435,163

[22] Filed: May 5, 1995

[30] Foreign Application Priority Data

May 6, 1994 [EP] European Pat. Off. ............ 94107164

[51] Int. Cl.$^6$ ..................... G11B 7/00; G06K 7/10
[52] U.S. Cl. .............. 369/119; 369/44.14; 359/198; 359/202
[58] Field of Search ............... 369/117, 44.14, 369/44.15, 44.19, 119; 359/202, 198; 235/462, 473, 463, 472; 250/227.13, 227.11, 227.26, 227.28, 556, 568, 226; 356/405, 419

[56] References Cited

U.S. PATENT DOCUMENTS

| | | | |
|---|---|---|---|
| 5,097,456 | 3/1992 | Tanoshima et al. | 369/44.15 |
| 5,150,343 | 9/1992 | Goto et al. | 369/44.22 |
| 5,321,684 | 6/1994 | Schaefer et al. | 359/209 |
| 5,323,000 | 6/1994 | Juffinger et al. | 250/227.13 |
| 5,409,537 | 4/1995 | Poullos et al. | 359/202 |
| 5,418,638 | 5/1995 | Hirasawa | 359/197 |
| 5,481,099 | 1/1996 | Dvorkis | 235/462 |
| 5,604,594 | 2/1997 | Juffinger | 356/405 |

FOREIGN PATENT DOCUMENTS

| | | |
|---|---|---|
| 0 163114 | 12/1985 | European Pat. Off. . |
| 0 560105 | 9/1993 | European Pat. Off. . |
| 41 42701 | 12/1991 | Germany . |

*Primary Examiner*—Georgia Y. Epps
*Assistant Examiner*—Kim-Kwok Chu
*Attorney, Agent, or Firm*—Birch, Stewart, Kolasch & Birch, LLP

[57] ABSTRACT

An optical reading device has projection optics which have an optical axis and focus light emitted by a light source present in a reading head, and having light receiving optics, arranged horizontally with respect to the optical axis, for receiving light focused by the projection optics and reflected back from an object. The light source can be displaced along the optical axis, relative to the projection optics, in order, during the scanning of pattern originals, to be able to change the size of the scanning light point in accordance with the original structure, without a displacement of the light receiving optics being necessary.

24 Claims, 4 Drawing Sheets

OPTICAL READING HEAD HAVING A DISPLACEABLE LIGHT SOURCE FOR SCANNING A TARGET HAVING SURFACE STRUCTURE

BACKGROUND OF THE INVENTION

1. Field of the Invention

The present invention is directed to an optical reading device having projection optics.

2. Description of Related Art

A reading device of this type is already known from EP 0 560 105 A3. This known optical reading device contains projection optics, which have an optical axis, and which focus light emitted by a light source present in a reading head, and further contains light receiving optics, arranged concentrically to the optical axis, for receiving the light focused by the projection optics and reflected back by an object.

The optical reading device is mainly used for reading color information in the case of scanners, especially in the case of drum scanners. In this device, by means of intensive point by point illumination of an original and evaluation of the color values of the reflected light, as well as moving the original past the location of the illumination and evaluation, the entire information content of the original is registered.

Difficulties most often arise when items of information are intended to be read from originals which, apart from the actual information, for example a color pattern, also have a surface structure. Such surface structures are present, for example in the case of woven or knitted fabrics, which contain a color pattern as information content to be evaluated. The structure of the surface of the material interferes with evaluation, since the narrow gaps caused by the structure mostly appear black or dark grey, because of the intensity of illumination being too low there, and these differences in lightness are superimposed on the color pattern. Here, the point diameter, within which the pattern is brightly illuminated, tries to be selected to be larger than the typical structure dimension, in order thereby at least to even out the influence of the surface structure. Although the color pattern then appears somewhat darker as a whole, the otherwise typical disturbances which consist of the color sequence: bright color—black color—bright color, can be avoided thereby. In the case of a woven fabric, the structure dimension is taken to mean the spacing of the warp or weft threads and, in the case of a knitted fabric, the mesh size. Similar problems are also present in the case of pattern originals which consist of painted or printed paper and, most certainly, paper provided with an embossing.

The illumination of the pattern original is carried out by means of projecting an intensively illuminated diaphragm aperture or a light guide exit opening, via a lens system, onto the pattern original. Different diameters of these points have previously been achieved by moving the cone of light, which is generated by the lens system, away from the pattern original to a greater or lesser extent. The smallest illumination point diameter results when the original comes to lie in the optical image plane.

Unfortunately, in the case of these reading optics, with the variation of the distance of the illumination optics from the original, the distance from the original of those optical parts whose task it is to capture the reflected light and to carry it to an evaluation unit, also changes. Since the light flux picked up by these parts is inversely proportional to the square of the distance, considerable changes of this light flux result. In particular in the case of relatively large scanning diameters, the lightness, and thus also the possible reading frequency, falls as a result.

SUMMARY OF THE INVENTION

The invention is based on the object of further developing an optical reading device such that, when the illumination point size is matched to the structure of the original, a change of distance between the original and the light receiving optics is no longer necessary.

The object of the present invention is met by providing an optical reading device with a light source which can be displaced along the optical axis, relative to the projection optics.

According to the invention, both the distance between the illumination optics and the original and the distance between the light receiving optics or reading optics and the original thus remain constant, while only the distance between the object to be projected and the illumination or projection optics is changed. Light losses because of a relative displacement between original and light receiving optics can thus no longer occur.

It is preferable if the projection optics contain achromatic lenses, since the optical reading head must be capable of cleanly focusing the scanning light fed to it. For instance, two achromatic lenses can be used for constructing the projection optics, in order to achieve the object. By means of the achromatic lenses, furthermore, large changes of the diameter of the scanning light spot result even in the case of small displacement movements of the light source, so that the constructional length of the optical reading head can be kept small.

According to an advantageous refinement of the invention, the light source is arranged in a displacer, which can be displaced with a snug fit in a displacement channel. The displacement channel can, for example, be arranged in a housing part receiving the projection optics, so that a simple and reliable light source along the optical axis is ensured. Preferably, the displacer and the displacement channel are of cylindrical construction, which significantly facilitates their production.

According to an advantageous development of the invention, the end face of a light guide, which is held by a mount in the displacer, is used as light source. By this means, the illumination light can be fed to the projection optics in a simple manner. The constructional outlay necessary for this is small.

In this arrangement, the mount can have a peripheral flange and can be fixed by means of a union nut which engages behind the latter and is screwed onto the displacer. Assembly and exchange of the light source can thus be carried out relatively easily.

The displacer, according to a further refinement of the invention, is coupled to an actuator drive, which can be an actuator drive actuated by an electric motor or operated manually. For example, the electric-motor actuator drive can be a stepping motor, while an actuator wheel or the like is provided for the manually actuated actuator drive.

To scan a pattern original, the optical reading head is mounted on a longitudinally displaceable slide, which also carries the actuator drive. In this arrangement, the optical axis and the displacement direction of the slide can be perpendicular to each other. This embodiment has been proven in the case of rotating pattern originals, which are present on the surface of a drum or have been fastened thereto. If the pattern original and the drum are rotated, and if at the same time the slide is displaced in the axial direction of the drum or parallel to its surface, points of the original lying on a helical drum path can be successively illuminated and scanned.

For example, an electric motor for driving a spindle can be present as actuator drive, on which spindle a spindle block, which is coupled to the displacer, can be displaced in a rotationally fixed manner. In this arrangement, the electric motor can be connected to the spindle via a coupling. An actuator can be fitted onto the spindle, so that the latter can be driven by hand, if, for example, spindle and electric motor are disconnected, so that the spindle block, and thus the displacer, can be displaced by hand.

A further scope of applicability of the present invention will become apparent from the detailed description given hereinafter. However, it should be understood that the detailed description and the specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail, with reference to the drawing, in which.

DETAILED DESCRIPTION OF THE PREFERRED EMBODIMENTS

Figure 1:
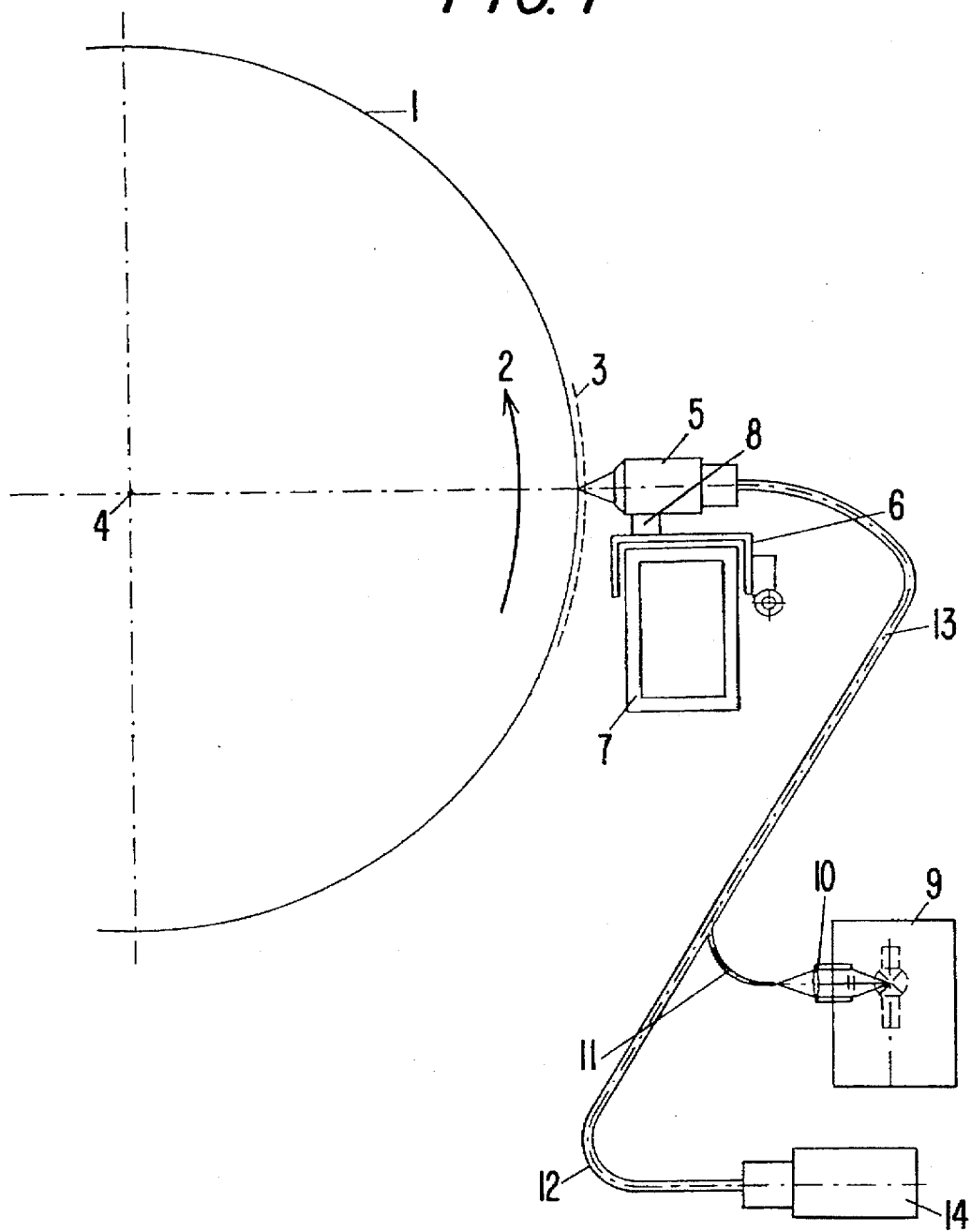
FIG. 1 shows a device for the optical scanning of a pattern original.

FIG. 1 shows a device having an optical reading head for scanning a pattern original. The device comprises a drum 1, which rotates in the direction 2, and carries on its outer surface a pattern original 3 to be read. In this arrangement, the pattern original 3 can be fastened on the drum 1 with adhesive strips or can be drawn against the surface of the drum 1 by means of a vacuum which is generated in the interior of the drum 1. So that suction can be applied to the pattern original 3, the drum 1 can be provided with suitable surface openings. The drum 1 itself rotates about its longitudinal or cylinder axis 4.

An optical reading head 5 ensures a point by point illumination of the drum or original surface. This optical reading head 5 is moved, by means of a slide 6, in the direction of the drum axis 4, along a vibrationally stiff guide 7. In so doing, the optical reading head 5 is positioned on the slide 6 by means of a holding device 8. The vibrationally stiff guide 7 is supported on a machine bed (not shown) on which are also located the receiving bearings which hold the drum 1 at the ends.

A lamp housing 9 is provided, in order to expose one end of a flexible light guide 11 to a very intensive light flux, via condenser optics 10. The light guide 11 is combined with further reflected light guides 12, which pick up the light reflected from the pattern original 3, to form a light guide strand 13, and leads to the optical reading head 5. There, the other end of the light guide 11, that is to say its light exit end, is projected by means of some components of the optical reading head 5 on the surface of the pattern original 3. As a result, a light and circular reading spot is generated on this surface. The light reflected from the surface of the pattern original 3 is picked up by means of other parts of the optical reading head 5 and fed, via the reflected light guides 12, to an evaluation unit 14, whose task it is to measure the color of the light guided back and to convert it into electrical signals.

Figure 2:
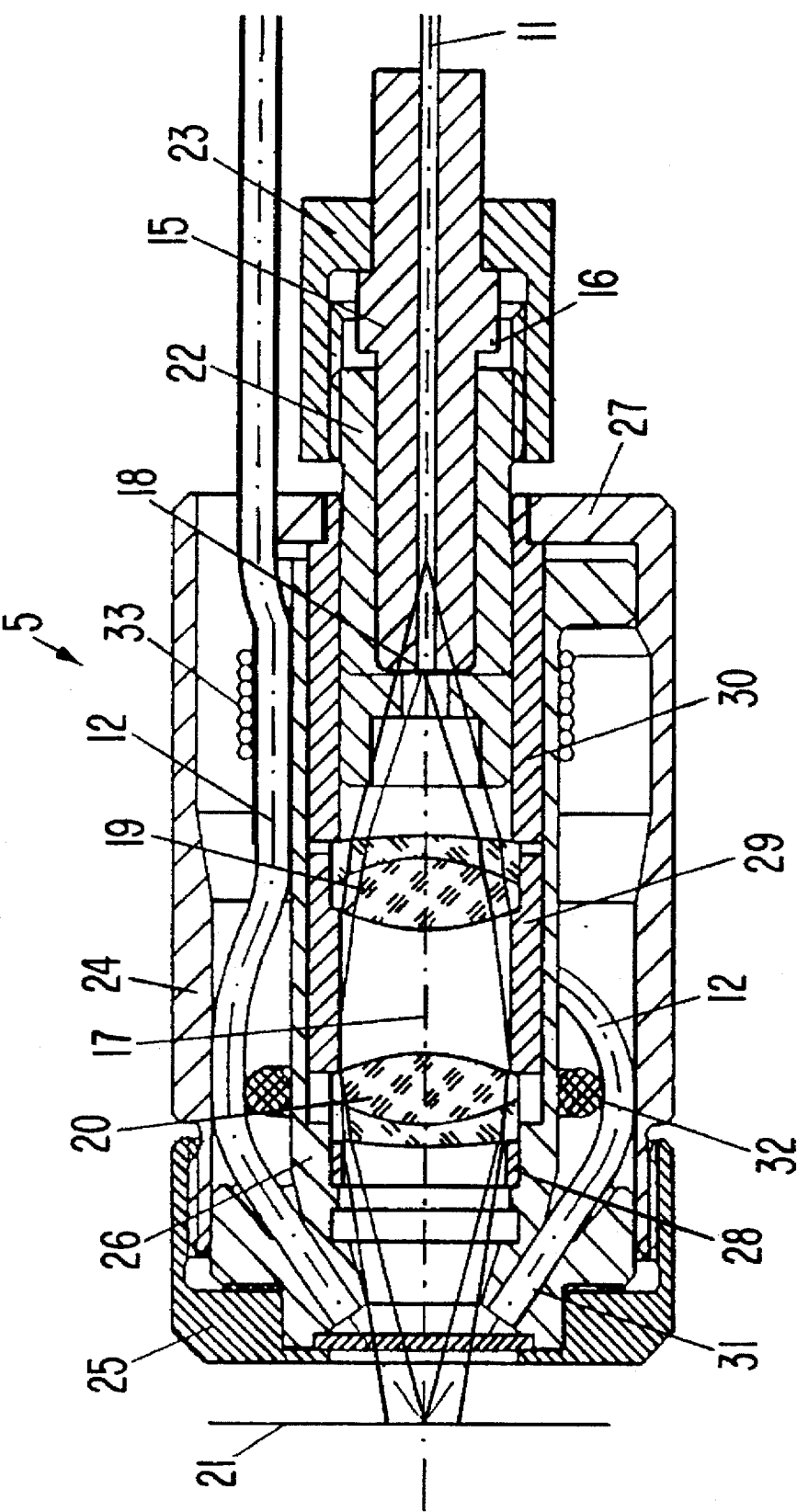
FIG. 2 shows an optical reading head of the device in accordance with FIG. 1.

FIG. 2 shows a longitudinal section through the optical reading head 5 in accordance with FIG. 1.

The light guide 11 is held, at its end region, in a cylindrical mount 15, which is provided in its rear region with a cylindrical peripheral flange 16. The central axis of the cylindrical mount 15 lies, in this arrangement, on the optical axis of the reading head 5. Here, the optical axis of the reading head 5 carries the reference symbol 17. The bundle of light emerging from the light exit end 18 of the light guide 11 is focused by two achromatic lenses 19 and 20, positioned on the optical axis 17, and is projected as an image of the light guide end 18 onto the surface 21 of the pattern original 3.

The cylindrical mount 15 is supported in a displacer 22, which is designed as a displacer sleeve. In this arrangement, the mount 15 is held with the aid of a union nut 23, which engages behind the peripheral flange 16 and, at its front side, is screwed onto an external thread in the rear region of the displacer 22. By means of the union nut 23, the mount 15 is pressed into the displacer 22, so that the light guide 11 extending along the central axis of the mount 15 comes to lie with its light exit end 18 exactly on the optical axis 17.

With the aid of a clamping nut 25, the housing inner part 26 is secured in an outer housing 24. The clamping nut 25 is screwed onto the front end region of the outer housing 24. In so doing, it presses the housing inner part 26 backwards and against a sequence of components located in the interior of the housing inner part 26, the components being supported, for their part, on a rear wall 27 of the outer housing 24. The components present within the housing inner part 26, seen towards the rear in the direction from the front end of the optical reading head 5, are a setting ring 28, a first hollow cylinder 29 and a second hollow cylinder 30. Both the hollow cylinders 29 and 30 and the setting ring 28 lie coaxial with the optical axis 17. In this arrangement, the first achromatic lens 19 is clamped in between the first hollow cylinder 29 and the second hollow cylinder 30, while the second achromatic lens 20 is clamped in between the setting ring 28 and the first hollow cylinder 29. The second hollow cylinder 30 further serves as displacement channel for the displacer 22. Here, the displacer 22 is guided with a snug fit in the second hollow cylinder 30.

The reflected light guides 12 are bonded into bores 31 of the housing inner part 26. The front ends of the reflected light guides 12 are guided through the bores in such a way that they run towards the optical axis 17 at an acute angle. In so doing, the surface normals of the end faces of these optical fibers 12 intersect in a common point lying on the optical axis 17. The reflected light guides 12 are led out of the housing 24 in the rear region of the optical reading head 5 and are initially deflected as gently as possible in the vicinity of their front ends by means of a rubber O-ring 32. After that they run to the rear, approximately parallel to the optical axis 17, and are combined with the light guide 11 to form the said light guide strand 13 after leaving the housing 24. Still within the housing 24, the reflected light guides 12 are fixed in their position by means of wire turns 33, so that the bonds within the bores 31 are subjected to hardly any load anymore, when tensile forces act on the light guide strand 13. To bond the reflected light guides 12 into the bores 31, an adhesive is used which has a very low refractive index, so that the total reflection at these points is largely maintained.

Figure 3:
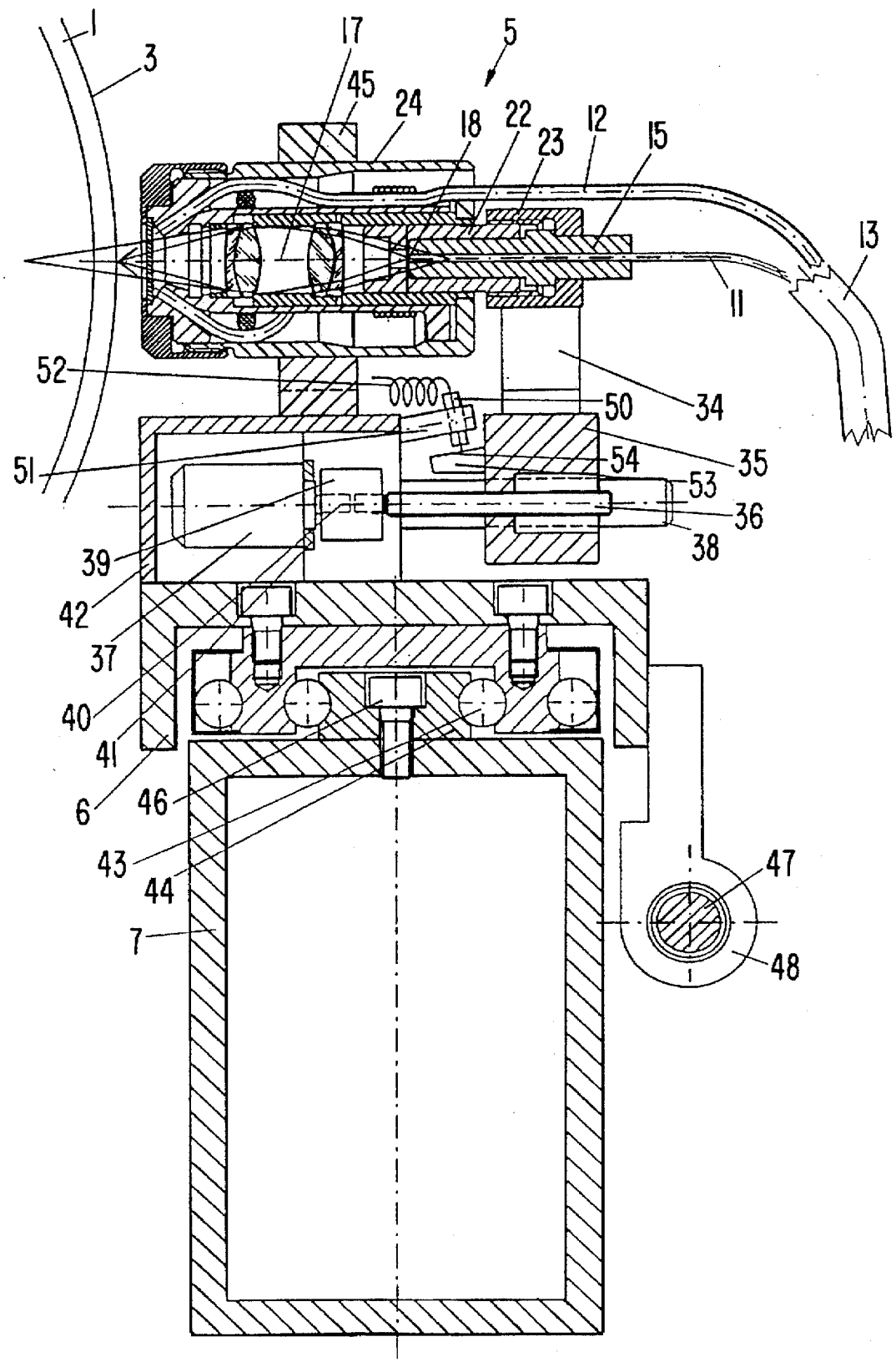
FIG. 3 shows the optical reading head in accordance with FIG. 2, connected to a displacer.

FIG. 3 shows a section, including the optical axis 17, perpendicular to the cylinder axis 4.

The displacer 22 is mounted, together with the mount 15 and the union nut 23, by means of a holder 34 on a cross-slide 35, and can adopt setting movements along the optical axis 17 from this cross-slide 35. An axial displacement of the cross-slide 35 by means of a spindle 36 and a miniature motor actuator 37 is, in this manner, imparted to the light guide exit end 18. If this light guide exit end is brought closer to the right-hand achromatic 19, the image of the light guide exit end 18 moves away further from the left-hand achromatic lenses 20 and, in addition, becomes larger. The cross-section, in which the cone of light is intersected by the surface of the drum 1, grows in this manner not only as a result of the image enlargement but also because of the moving away of the image position into the interior of the drum and grows significantly even with small position changes of the light guide exit end 18. Polished round guides 38 ensure trouble-free guiding of the cross-slide 37. The spindle 36 is connected in a rotationally stiff manner to a drive shaft 40 of the motor actuator 37 by means of a coupling 39. The setting motor 37 is held on a motor housing 42 by means of a securing plate 41. The motor housing 42 is seated firmly on the slide 6, which for its part is guided by means of recirculating-ball guides 43 along a guide rail 44, exactly parallel to the central axis 4 of the drum 1. Furthermore, the optical reading head 5 is supported on the motor housing 42 via a holder 45. The guide rail 44 is screwed to a flexurally rigid and torsionally rigid box carrier via screws 46, the box carrier forming the vibrationally stiff guide 7 already mentioned at the beginning. A longitudinal spindle 47, which is driven by a stepping motor, no longer shown, ensures the continuous movement of the entire construction during the reading process, that is to say the drive of the slide 6. This movement is picked up from the spindle by a nut housing 48 and is transmitted to the longitudinal slide 6.

Of course, a more simple manual displacement can also be provided instead of the motorized displacement of the cross-slide 35 by means of the motor actuator 37. The spindle 36 is then disconnected from the motor actuator 37 and a hand wheel, not shown, is mounted on its free end.

Figure 4:
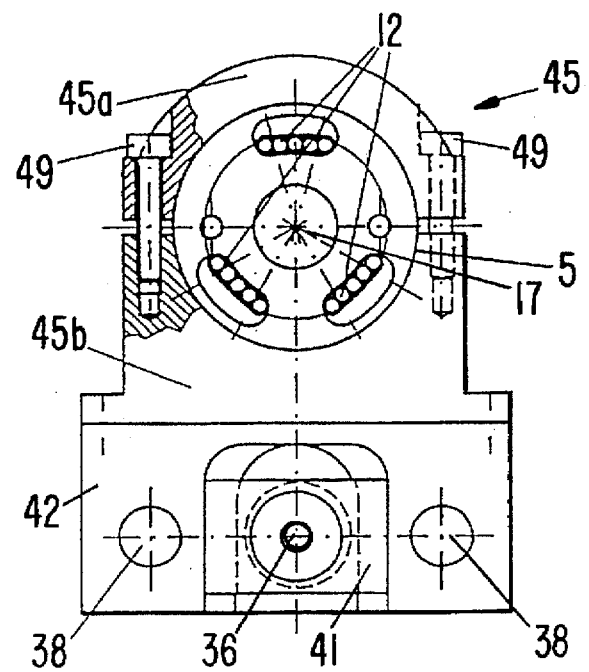
FIG. 4 shows a section, lying perpendicular to the optical axis, through the optical reading head in the region of the electric-motor actuator drive.

FIG. 4 shows a view of the rear side of the optical reading head 5, which is carried by the holder 45. This holder 45 rests on the motor housing 42 and comprises a lower part 45b and an upper part 45a. Both parts 45a and 45b have mutually mating semicircular recesses for receiving the cylindrical reading head 5 and are moved towards each other with the aid of screws 49 in order to clamp the reading head 5 between them. As can be seen, the polished round guides 38 run parallel to the optical axis 17 of the reading head 5. This is correspondingly true of the spindle 36. The polished round guides 38 are likewise supported on the motor housing 42 and receive the spindle 36 between themselves.

Figure 5:
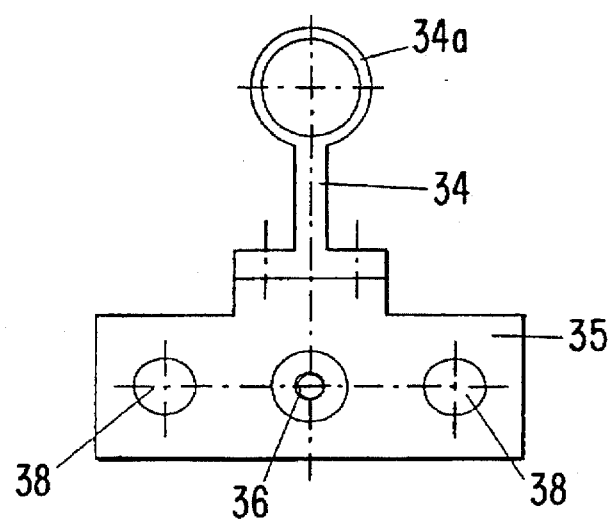
FIG. 5 shows a section, lying perpendicular to the optical axis, through the optical reading head in the region of a holding device for the displacer.

The cross-slide 35, which is shown in FIG. 5 and is equipped with corresponding passage bores for receiving the round guides 38, is seated on the rearward-pointing extensions of the polished round guides 38. The spindle 36 is screwed through into a corresponding passage internal thread in the cross-slide 35. The cross-slide 35 carries, on its upper surface, connected to it in a fixed manner, the holder 34, which has at the top a circular holder 34a for the union nut 23. It can be inserted with a snug fit into the circular holder 34a and be seated in the latter in a fixed manner. If the cross-slide is moved along the round guides 38 by displacing the spindle 36, the displacer 22 is correspondingly driven, via the holder 34 and its holder 34a, so that the light guide exit end 18 is displaced in this manner.

FIG. 3 further shows a proximity sensor 50. This proximity sensor 50 can be, for example, an inductively operating sensor. The proximity sensor 50 is connected in a fixed manner to the motor housing 42 via a rigid bracket 51 and, in addition, via an electrical lead 52 to evaluation electronics, not shown. Underneath the proximity sensor 50, there is a scanning table 53, which is connected in a fixed manner to the cross-slide 35. The scanning table 53 has a surface 54 which extends obliquely with respect to the longitudinal direction of the spindle 36 and obliquely with respect to the optical axis 17. It is inclined as seen in the direction of the drum 1. If the cross-slide 35 is moved along the polished round guides 38, the distance between the proximity sensor 50 and the surface 54 of the scanning table 53 is thus also changed. Each distance thus obtained between the proximity sensor 50 and the surface 54 of the scanning table 53 is associated with a corresponding magnitude of the diameter of the cone of light of the optical reading head 5 on the surface of the drum 1 or pattern original 3. By means of calibrating the distances, light spot sizes can thus be prescribed or pre-stored for the respective distances. These light spot sizes can then be selected by setting a desired distance between the proximity sensor 50 and the surface 54 of the scanning table 53. This is possible since the diameter of the drum 1 and the thickness of the pattern original 3 is constant for all scanning processes. If other drum diameters or pattern original thicknesses are to be used, a corresponding re-adjustment of distance can be carried out.

The invention being thus described, it would be obvious that the same may be varied in many other ways. Such variations are not to be regarded as a departure from the spirit and scope of the invention, and also as modifications as would be obvious to one skilled in the art are intended to be included within the scope of the following claims.

I claim:

1. A method of varying a spot size on an object being illuminated by an optical reading device, comprising the steps of:

emitting light from a light source;

focussing said emitted light onto an object by projection optics having an optical axis;

arranging light receiving optics to receive light reflected from the object; and displacing said light source along said optical axis relative to said projection optics.

2. The method according to claim 1, further comprising, before said displacing step, mounting the optical reading device on a longitudinally displaceable drive.

3. The method according to claim 1, further comprising calibrating a distance between the optical reading device and a workplace such that a size of a light spot on the object corresponds to a particular distance.

4. The method according to claim 1, further comprising determining a distance between the optical reading device and the object and controlling said displacing step in accordance with the distance from said determining step.

5. An optical reading device comprising:
- a light source which emits light;
- projection optics which focus said light onto an object, said projection optics having an optical axis;
- light receiving optics which receives light focussed by said projection optics and reflected back from the object; and
- displacing means for displacing said light source along said optical axis relative to said projection optics.

6. The optical reading device according to claim 5, wherein said displacing of said light source does not affect said light receiving optics.

7. The optical reading device according to claim 5, wherein said light receiving optics are fixed.

8. The optical reading device according to claim 5, further comprising a proximity sensor for determining a distance between said optical reading device and said object, said displacing means displacing said light source in accordance with said distance.

9. The optical reading device according to claim 8, wherein said proximity sensor includes a surface having a same inclination as said object.

10. The optical reading device according to claim 5, further comprising means for calibrating a distance between the optical reading device and a workplace such that a size of a light spot on the object corresponds to a particular distance.

11. The optical reading device according to claim 10, further comprising a spindle having a cross-slide coupled to said displacing means, and wherein said means for calibrating comprises a surface extending obliquely with respect to the longitudinal direction of said spindle and said optical axis, said surface being fixedly connected to said cross-slide, and a proximity sensor which measures a distance to said surface.

12. The optical reading device according to claim 5, wherein said light receiving optics are arranged concentrically to said optical axis.

13. The optical reading device according to claim 5, wherein said projection optics include achromatic lenses.

14. The optical reading device according to claim 5, wherein said displacing means comprises a displacer containing said light source, said displacer being fitted snugly in a displacement channel and being displaceable along said displacement channel.

15. The optical reading device according to claim 14, wherein said displacement channel is arranged in a housing receiving said projection optics.

16. The optical reading device according to claim 14, wherein said displacer and said displacement channel are cylindrical.

17. The optical reading device according to claim 14, further comprising:
- a spindle having a cross-slide coupled to said displacer; and
- an electric motor which drives said spindle.

18. The optical reading device according to claim 14, further comprising an actuator drive to which said displacer is coupled.

19. The optical reading device according to claim 18, further comprising a spindle having a cross-slide coupled to said displacer, said cross-slide being displaceable along said spindle in a rotationally fixed manner, and wherein said actuator drive is manually operated and fixed onto said spindle.

20. The optical reading device according to claim 18, further comprising a spindle having a cross-slide coupled to said displacer, said cross-slide being displaceable along said spindle in a rotationally fixed manner, and wherein said actuator drive comprises an electric motor which drives said spindle.

21. The optical reading device according to claim 20, further comprising a coupler connecting said electric motor and said spindle.

22. The optical reading device according to claim 18, further comprising:
- a longitudinally displaceable slide carrying said actuator drive; and
- means for mounting the optical reading device on said longitudinally displaceable slide.

23. The optical reading device according to claim 22, wherein said optical axis and a displacement direction of said longitudinally displaceable slide are perpendicular to each other.

24. The optical reading device according to claim 5, further comprising:
- a mount receiving means for delivering said light to said projection optics, said mount having a peripheral flange; and
- a union nut securing said mount to said displacing means.

* * * * *